US006175231B1

United States Patent
Budaker et al.

(10) Patent No.: US 6,175,231 B1
(45) Date of Patent: Jan. 16, 2001

(54) SYSTEM HOUSING FOR ELECTRONICALLY ASSISTED POWER STEERING SYSTEM WITH INSIDE PULSE TRANSMITTER AND OUTSIDE SENSOR

(75) Inventors: Martin Budaker, Heubach; Gerhard Hägele, Hohenstadt; Willi Nagel, Schwäbisch Gmünd, all of (DE)

(73) Assignee: ZF Friedrichshafen AG, Friedrichshafen (DE)

( * ) Notice: Under 35 U.S.C. 154(b), the term of this patent shall be extended for 0 days.

(21) Appl. No.: 09/106,357

(22) Filed: Jun. 29, 1998

(30) Foreign Application Priority Data

Jun. 30, 1997 (DE) ............................................. 197 27 665

(51) Int. Cl.⁷ .............................. G01B 7/30; G01B 7/14; B62D 5/04
(52) U.S. Cl. ...................... 324/173; 324/207.25; 180/444
(58) Field of Search .................... 324/207.11, 207.12, 324/207.2, 207.21, 207.25, 226, 173, 174; 361/600, 679; 180/444

(56) References Cited

U.S. PATENT DOCUMENTS 4,874,053 * 10/1989 Kimura ........................... 324/207.21
5,248,939   9/1993 Brauer .
5,523,681 * 6/1996 Hajzler ................................ 324/174

FOREIGN PATENT DOCUMENTS 38 35 955 A1   11/1989 (DE) .

OTHER PUBLICATIONS

"Durch Die Wand", elektro Automation 48, Jg. Nr. 3, Mar. 1995, pp. 39–41.

* cited by examiner

Primary Examiner—Walter E. Snow
(74) Attorney, Agent, or Firm—Larson & Taylor PLC

(57) ABSTRACT

An electronically assisted power steering system for motor vehicles contains a primary shaft (4), which is in operative connection with a manual steering wheel for transmitting the steering torque required for steering the steerable wheels of the vehicle. An auxiliary force can be exerted on the primary shaft (4) or the output member by a servo motor (6). A detection unit is used for non-contact detection of the direction and value of a steering angle and/or other movement-dependent values occurring at the primary shaft (4). The detection unit includes at least one pulse transmitter (13) connected with the primary shaft (4) or the output member, and at least one sensor (10). The pulse transmitter (13) is located in the interior of a housing (1), and the sensor (10) outside the housing (1). There is a gap between the pulse transmitter (13) and the sensor (10). The housing (1) is closed in the area located between the pulse transmitter (13) and the sensor (10).

7 Claims, 2 Drawing Sheets

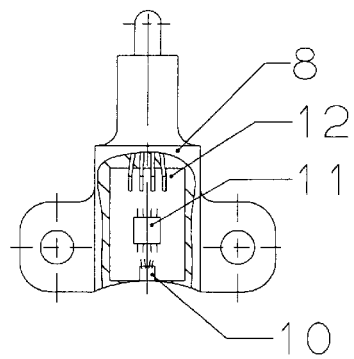
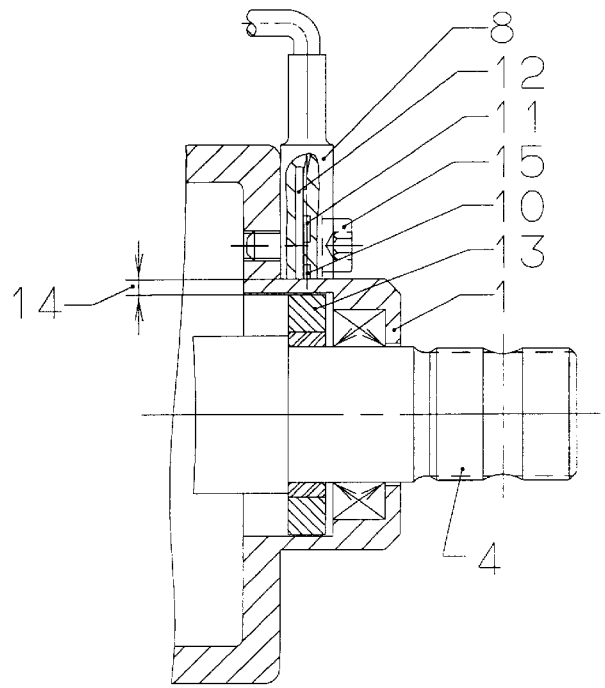
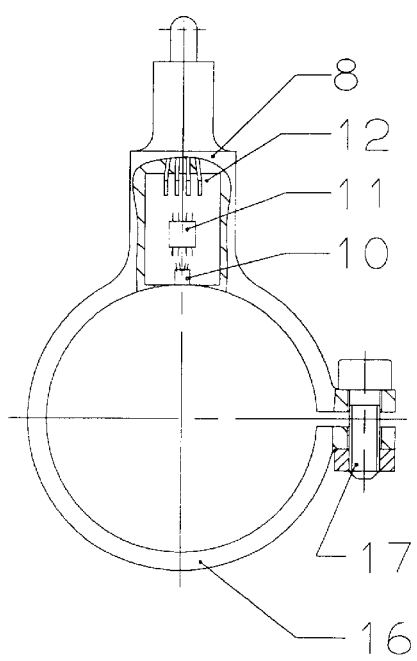
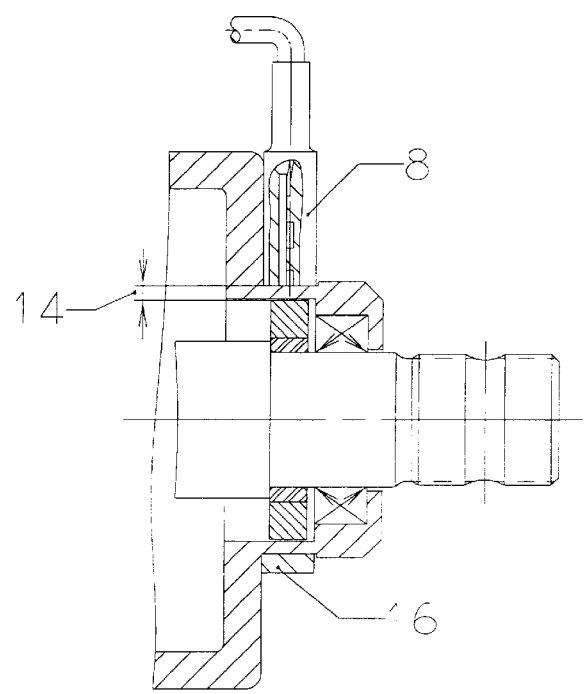
FIG. 3
FIG. 2
FIG. 5
FIG. 4

SYSTEM HOUSING FOR ELECTRONICALLY ASSISTED POWER STEERING SYSTEM WITH INSIDE PULSE TRANSMITTER AND OUTSIDE SENSOR

BACKGROUND OF THE INVENTION

1. Field of the Invention

The invention relates to an electronically assisted power steering system for motor vehicles. The power steering system contains a primary shaft, which is in operative connection with a manual steering wheel and is used for transmitting the torque necessary for the steering of the wheels of the vehicle. The power steering system also includes an output member which is in operative connection with the wheels. Using a servo motor, an auxiliary force can be exerted on the primary shaft or the output member. A non-contact detection unit is provided for the non-contact detection of the direction and strength of a steering torque acting on the primary shaft, and/or for detecting the direction and/or the speed of a steering movement of the primary shaft, and/or for detecting another movement and/or movement change of the primary shaft and/or of the output member or of another element of the power steering system. The detection unit includes at least one pulse transmitter connected with the primary shaft and/or the output member or with another element of the power steering system and at least one sensor. The pulse transmitter is arranged in a housing and the sensor is outside of the housing. There is a gap between the pulse transmitter and the sensor.

2. Description of the Prior Art

A similar power steering system is known, for example, from German Patent Publication DE 38 35 955 A1. A non-contacting rotary force sensor is arranged in the area of a steering spindle of this power steering system, by means of which the rotary force in the power steering system can be detected. The rotary force sensor contains two magnetic cylinders, or magnetic rings, and a magnetoresistive unit, or a sensor assembly with magnetoresistive sensors, which project into the interior of the steering system housing from the outside. An air gap exists between the two magnetic cylinders and the magnetoresistive unit.

The opening in the housing, through which the magnetoresistive units project into the interior, is disadvantageous in this version. This opening must be specially produced as an aperture in the housing, thereby creating additional expense. It is also necessary to dependably seal this aperture, so that no impurities can enter the housing.

SUMMARY OF THE INVENTION

It is the object of the invent ion to avoid the disadvantages of the prior art and to make the production of the housing and the required sealing more cost-effective.

This object is attained by means of the power steering system of the present invention. Here, the housing is embodied to be closed in an area located between the pulse transmitter and the sensor. Contrary to the current beliefs of experts in the field, it has been found that the gap between the pulse transmitter and the sensor of a non-contacting rotary steering force sensor or other detection unit can be filled with different materials than air. It is therefore possible to do without an aperture in the housing.

Useful and advantageous embodiments of the invention are disclosed herein. For example, it is advantageous if the housing consists of a non-ferromagnetic material, at least in the area located between the pulse transmitter and the sensor.

Structurally the sensor can be usefully arranged on a sensor housing which is bolted to the housing or is fastened to the housing by means of a clamp. It is particularly simple and therefore cost-effective, if the sensor is arranged, together with the electronic unit, on a printed circuit board in the sensor housing.

The invention will be explained in more detail in what follows by means of two exemplary embodiments represented in the drawings.

BRIEF DESCRIPTION OF THE DRAWINGS

FIG. 2 is a longitudinal section in the area of the detection unit on an enlarged scale;

FIG. 3 is a partial section of the detection unit, and

FIGS. 4 and 5 are partial sections analogous to FIGS. 2 and 3, but in relation to a second exemplary embodiment.

DETAILED DESCRIPTION OF THE PREFERRED EMBODIMENTS

Figure 1:
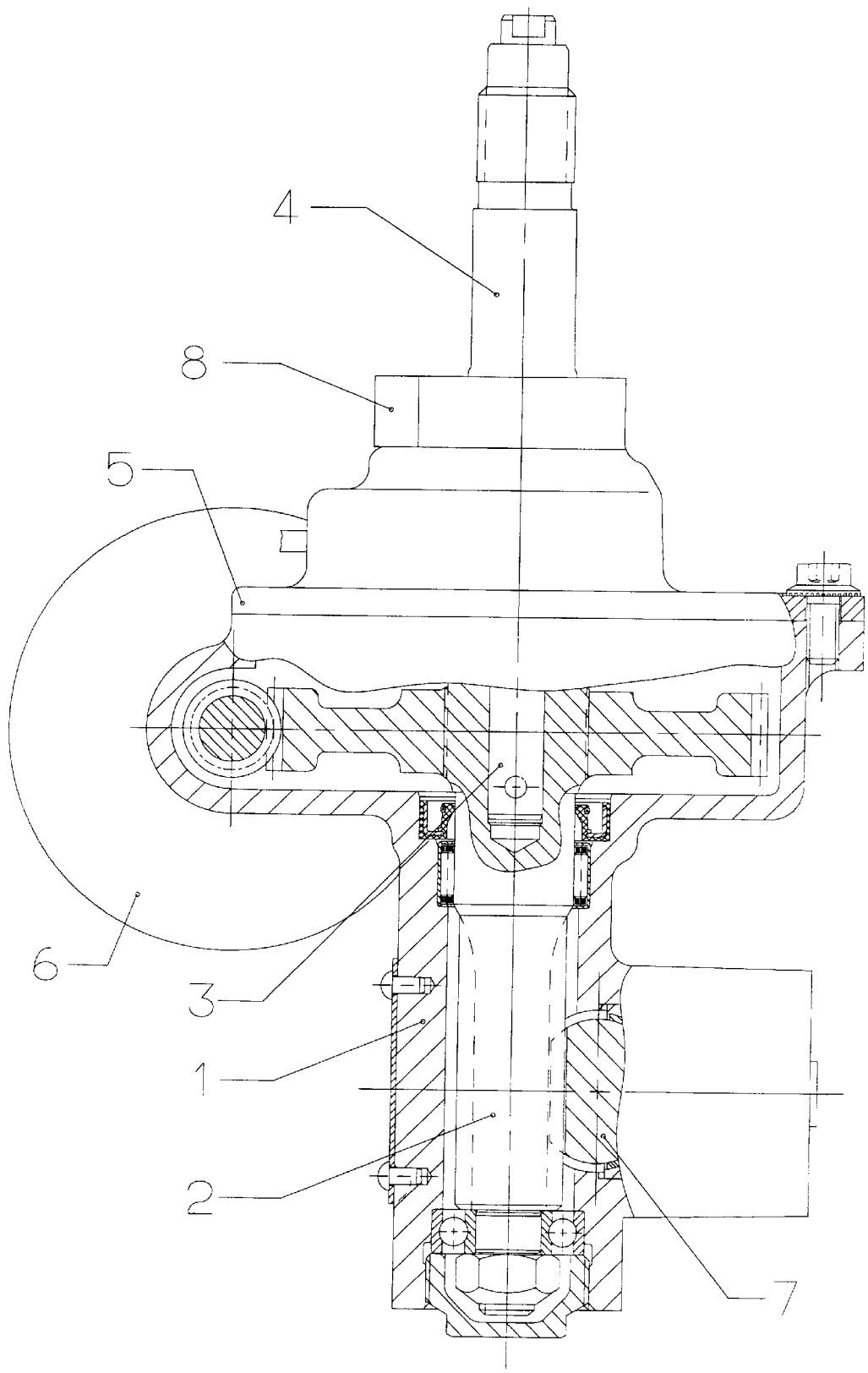
FIG. 1 is a longitudinal section through the power steering system in accordance with the invention showing an example of rack and pinion steering.

The invention will be explained by means of an example of a power steering system with rack and pinion steering. However, the invention can be used with the same effects with other servo-assisted steering systems, for example those with ball and nut steering, or with a steering column divided by the steering system.

A pinion 2 is rotatably seated in a steering system housing, called housing 1 for short. The pinion 2 is connected via a torsion bar 3 with a primary shaft 4. The pinion 2 is also in driven connection with an electric motor 6 via a toothed system 5. The pinion 2 is also in driven connection via a rack 7 with the steerable wheels of a vehicle (not shown).

A sensor housing 8 is fastened on a portion of the housing 1, in the exemplary embodiment in accordance with FIG. 1 in the upper portion adjoining the primary shaft 4.

A sensor 10, together with an electronic unit 11, is fastened on a printed circuit board 12 in the sensor housing 8. A pulse transmitter 13 in the form of a magnetic ring, which is arranged in the interior of the housing 1, cooperates with the sensor 10. It is important that a defined gap 14 be provided between the sensor 10 and the pulse transmitter 13. In accordance with the invention this gap 14 is not filled with air, but with any other material which is not ferromagnetic. Therefore the housing 1 consists of a non-ferromagnetic material, at least in this area, such as aluminum, magnesium or a plastic material.

The sensor 10 and the pulse transmitter 13, together with the electronic unit 11, constitute a detection unit for non-contact detection of the direction and value of a steering angle occurring at the primary shaft 4. In this case the change of a magnetic field, which is caused by a movement of the pulse transmitter 13, is measured. It is also possible by using at least two pulse transmitters and sensors, to detect and measure torque, for example.

In an alternative embodiment, wherein the electric motor 6 does not act on the pinion 2, but on the rack 7 or the primary shaft 4, or on a steering column connected with the primary shaft 4, the detection unit can be arranged at another location on the power steering system.

Furthermore, the detection unit can also be used for non-contact detection of the direction and/or the speed of a steering movement of the primary shaft 4, and/or for detecting another movement, and/or the movement change of the primary shaft 4 and/or of the output member or of another movable element of the power steering system.

In accordance with the exemplary embodiment of FIGS. 2 and 3, the sensor housing 8 is fastened on the housing by means of fixing bolts 15.

In the exemplary embodiment in accordance with FIGS. 4 and 5, the sensor housing 8 is fastened on the housing 1 by means of a clamp 16. In this connection it is useful if the sensor housing 8 is integral with the clamp 16, as can be seen in FIG. 5. The fact, that in the exemplary embodiment in accordance with FIGS. 4 and 5 the tapped holes for the fixing bolts 15 in the housing 1 can be omitted, is particularly advantageous here. On the other hand, the sensor housing 8 can be clamped by screws 17 to any arbitrary location on the circumference of the housing 1.

Because of the invention it is possible to omit apertures in the housing 1 in the area of the detection unit. Therefore the detection unit can also be arranged at locations of the housing 1 which are difficult to access. In this way it becomes possible, depending on the respective application, to detect mechanical values, such as distance, angles, speed, direction of rotation, acceleration, and the number of revolutions for elements undergoing rotational movement and/or translational movement, in the steering train. If, for example, it is intended to detect a translational movement of the rack 7, it is possible to use a bar magnet (not shown) in place of a magnet ring as the pulse transmitter 13 in the area of the rack 7.

The foregoing description was presented for the purpose of illustrating the invention and is not intended to limit the scope of the invention in any way. The scope of the invention is to be determined from the claims appended hereto.

What is claimed is:

1. An electronically assisted power steering system for a motor vehicle comprising:
    a primary shaft which is operatively connected at a distal end to a manual steering wheel for transmitting a steering torque from the steering wheel which steers the steerable wheels of the motor vehicle, and which includes a proximal end;
    an output member which is operatively connected at a distal end to the steerable wheels, and which includes a proximal end;
    a servo motor having a proximal end which exerts an auxiliary force on the primary shaft or the output member;
    a detection unit which provides a non-contact detection of one or more of (a) a direction and strength of a steering torque acting on the primary shaft, (b) a direction or speed of a steering movement of the primary shaft, (c) another change in movement of the primary shaft or the output member, and (d) another element of the power steering system, the detection unit including
    a pulse transmitter connected with one or more of the primary shaft, of the output member, or of another element of the servo-assisted steering system, a sensor, and
    a gap provided between the pulse transmitter and the sensor; and
    a system housing which encloses the proximal ends of the primary shaft, the output member, and the servo motor, and inside of which the pulse transmitter is located and outside of which the sensor is located, the system housing extending throughout the gap provided between the pulse transmitter and the sensor.

2. The electronically assisted power steering system for motor vehicles as claimed in claim 1, wherein the system housing is made of a non-ferromagnetic material, at least in the area located between the pulse transmitter and the sensor.

3. The electronically assisted power steering system for motor vehicles as claimed in claim 2, wherein the sensor is arranged in a sensor housing separate from the system housing.

4. The electronically assisted power steering system for motor vehicles as claimed in claim 3, wherein the sensor, together with an electronic unit, is arranged on a printed circuit board located in the sensor housing.

5. The electronically assisted power steering system for motor vehicles as claimed in claim 3, wherein the sensor housing is bolted to the system housing.

6. The electronically assisted power steering system for motor vehicles as claimed in claim 3, wherein the sensor housing is fastened by means of a clamp to the system housing.

7. The electronically assisted power steering system for motor vehicles as claimed in claim 6, wherein the sensor housing is integral with the clamp.

* * * * *